United States Patent
Song

(10) Patent No.: US 9,129,632 B1
(45) Date of Patent: Sep. 8, 2015

(54) LOOP PULSE ESTIMATION-BASED FLY HEIGHT DETECTOR

(71) Applicant: Avago Technologies General IP (Singapore) Pte. Ltd., Singapore (SG)

(72) Inventor: Xiufeng Song, San Jose, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/523,983

(22) Filed: Oct. 27, 2014

(51) Int. Cl.
*G11B 5/60* (2006.01)

(52) U.S. Cl.
CPC .................... *G11B 5/6029* (2013.01)

(58) Field of Classification Search
None
See application file for complete search history.

(56) References Cited

U.S. PATENT DOCUMENTS

| | | | |
|---|---|---|---|
| 4,715,257 A | 12/1987 | Hoshiai et al. | |
| 4,777,544 A | 10/1988 | Brown et al. | |
| 5,086,475 A | 2/1992 | Kutaragi et al. | |
| 5,111,727 A | 5/1992 | Rossum | |
| 5,377,058 A | 12/1994 | Good et al. | |
| 5,814,750 A | 9/1998 | Wang et al. | |
| 6,097,559 A | 8/2000 | Ottensen | |
| 6,191,901 B1 | 2/2001 | Carlson | |
| 6,519,102 B1 | 2/2003 | Smith et al. | |
| 6,735,027 B2 * | 5/2004 | Helsel et al. | 360/75 |
| 6,865,040 B2 * | 3/2005 | Fayeulle et al. | 360/75 |
| 6,937,424 B2 | 8/2005 | Chang et al. | |
| 7,016,131 B2 | 3/2006 | Liu et al. | |
| 7,038,875 B2 | 5/2006 | Lou et al. | |
| 7,158,325 B1 | 1/2007 | Hu et al. | |
| 7,222,289 B2 | 5/2007 | Hung | |
| 7,230,781 B2 * | 6/2007 | Ma et al. | 360/31 |
| 7,542,227 B2 * | 6/2009 | Che et al. | 360/75 |
| 7,773,336 B2 * | 8/2010 | Che et al. | 360/75 |
| 7,830,369 B2 | 11/2010 | Kageyama et al. | |
| 8,014,099 B2 * | 9/2011 | Mathew et al. | 360/75 |
| 8,054,573 B2 * | 11/2011 | Mathew et al. | 360/75 |
| 8,145,443 B2 | 3/2012 | Kang et al. | |
| 8,154,818 B2 * | 4/2012 | Mathew et al. | 360/75 |
| 8,154,820 B1 | 4/2012 | Madden et al. | |
| 8,615,539 B2 | 12/2013 | Skaug | |
| 8,630,055 B2 * | 1/2014 | Goldberg et al. | 360/75 |
| 2007/0268615 A1 | 11/2007 | McFadyen et al. | |

(Continued)

FOREIGN PATENT DOCUMENTS

| | | |
|---|---|---|
| EP | 2031759 | 3/2004 |
| WO | WO 02/093546 | 11/2002 |
| WO | WO 2010/014078 | 2/2010 |

OTHER PUBLICATIONS

Boettcher, et al., "Dynamic Flying Height Adjustment in Hard Disk Drives Through Feed forward Control" IEEE Trans. Magnetics, vol. 47, No. 7, Jul. 2011.

(Continued)

*Primary Examiner* — Wayne Young
*Assistant Examiner* — James L Habermehl
(74) *Attorney, Agent, or Firm* — Hamilton DeSanctis & Cha

(57) ABSTRACT

An apparatus for storing data includes a storage medium, a head assembly disposed in relation to the storage medium and operable to read and write data on the storage medium, a loop pulse estimation circuit operable to estimate a channel impulse response based on the data read by the head assembly, and a fly height detection circuit operable to detect a spacing between the head assembly and the storage medium based at least in part on the channel impulse response.

20 Claims, 4 Drawing Sheets

(56) References Cited

U.S. PATENT DOCUMENTS

2008/0071367 A1  3/2008  Bergin
2011/0043938 A1* 2/2011  Mathew et al. .............. 360/75

OTHER PUBLICATIONS

Liu, et al., "Head Disk Spacing Variation Suppression via Active Flying Height Control" IEEE Instrumentation and Measurement Technology Conf. Budapest, Hungary May 21-23, 2001.

* cited by examiner

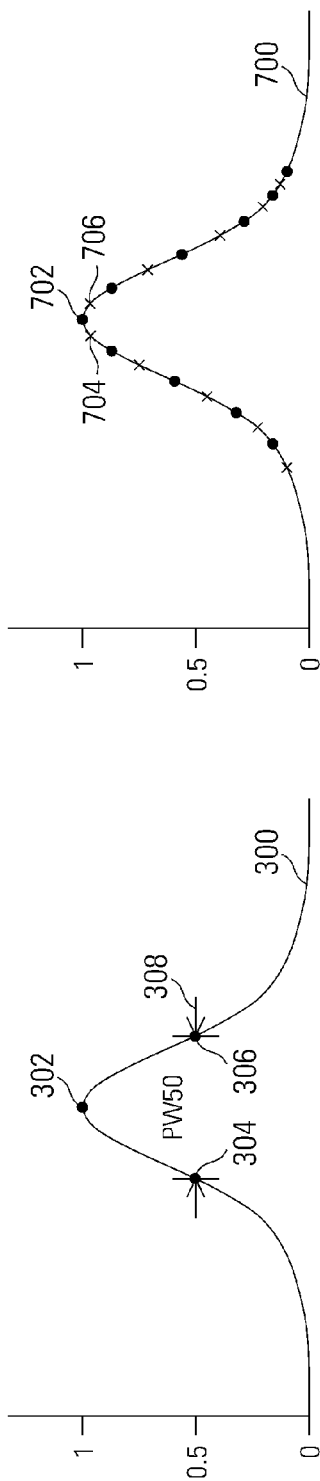
FIG. 3
FIG. 7
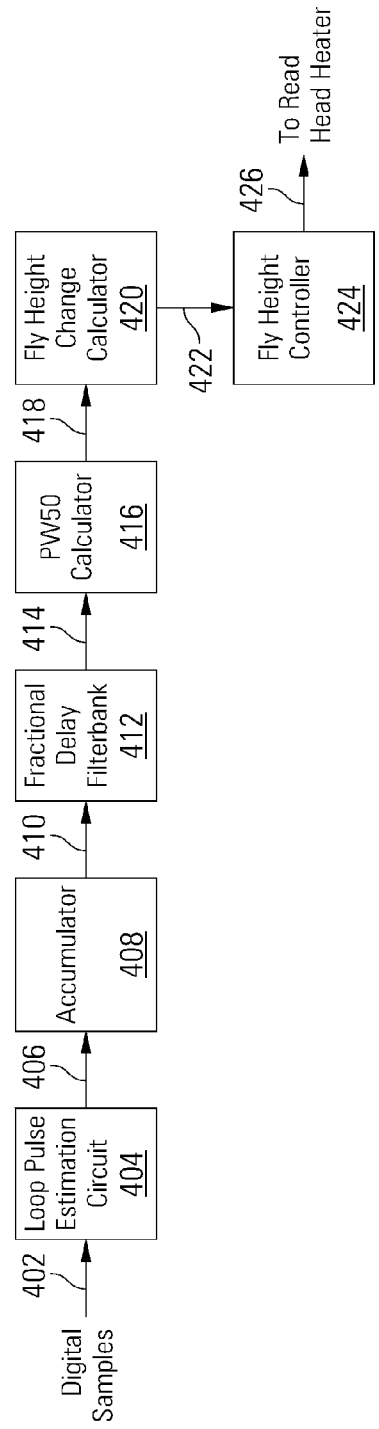
FIG. 4

LOOP PULSE ESTIMATION-BASED FLY HEIGHT DETECTOR

FIELD OF THE INVENTION

The present invention is related to systems and methods for determining fly height or separation between a read head and a magnetic storage medium.

BACKGROUND

Typical implementations of hard disk based storage devices utilize a thermal element to control the fly height of the read/write head. Heating the thermal element causes a distance between the read/write head and a storage medium to decrease. Where the heat generated by the thermal element is sufficient, the read/write head may be brought into contact with the storage medium. In some cases, this contact can damage one or more components of the storage device.

SUMMARY

Various embodiments of the present invention provide systems, apparatuses and methods for determining fly height between a head assembly and a storage medium.

In some embodiments, an apparatus for storing data includes a storage medium, a head assembly disposed in relation to the storage medium and operable to read and write data on the storage medium, a loop pulse estimation circuit operable to estimate a channel impulse response based on the data read by the head assembly, and a fly height detection circuit operable to detect a spacing between the head assembly and the storage medium based at least in part on the channel impulse response This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

FIG. 3 is a graph of normalized channel impulse response illustrating a PW50 distance between half-peak points in accordance with some embodiments of the present invention;

FIG. 4 depicts a block diagram of a loop pulse estimation-based fly height detector in accordance with some embodiments of the present invention;

FIG. 7 is a graph of normalized channel impulse response illustrating discrete domain sampling points in accordance with some embodiments of the present invention;

DETAILED DESCRIPTION OF THE INVENTION

The present invention is related to systems and methods for determining fly height or separation between a read/write head assembly and a magnetic storage medium based on a loop pulse estimation. The resulting fly height value can be used to adjust the control signal to a heater or other fly height control mechanism. The separation between the read/write head assembly and the storage medium can thereby be controlled, preventing contact or touch down between the read/write head assembly and the storage medium. By precisely controlling the fly height, the signal to noise ratio (SNR) is increased and data recovery performance from the read channel is improved.

A loop pulse estimation circuit is included in the read channel to compute an estimated loop pulse response or channel impulse response of the read channel. In various embodiments, the loop pulse estimates are filtered or de-noised and interpolated to adjust sampling phase. The PW50, or distance between half-peak locations on the normalized channel impulse response, is calculated. Changes in fly height are then inferred based on changes in the PW50 value, based on the relationship between the channel impulse response and the fly height. This relationship is dependent on the particular system configuration and design, and can be determined experimentally, through simulations, or by any other suitable means. Based upon the disclosure provided herein, one of ordinary skill in the art will recognize a variety of techniques for mapping PW50 values and fly height in a particular storage system. In some embodiments, the fly height control system uses changes in PW50 values to infer changes in fly height from absolute fly height values determined during calibration. In some other embodiments, the fly height control system uses the PW50 values to infer absolute fly height values.

In some embodiments, the magnetic storage medium comprises an array reader magnetic recording system, in which multiple read sensors are included in the read/write head assembly to read from a target data track. Loop pulse estimations are computed for multiple read sensors and fly height detection performed based on the multiple loop pulse estimations. Circuitry can be shared in a variety of manners, for example sharing a single fly height detection circuit for multiple read sensors, sharing loop pulse estimation circuits, etc. The resulting PW50 values for the multiple read sensors can be used separately, or can be combined in any desired manner to yield a fly height for the read/write head assembly including the multiple read sensors.

Figure 1:
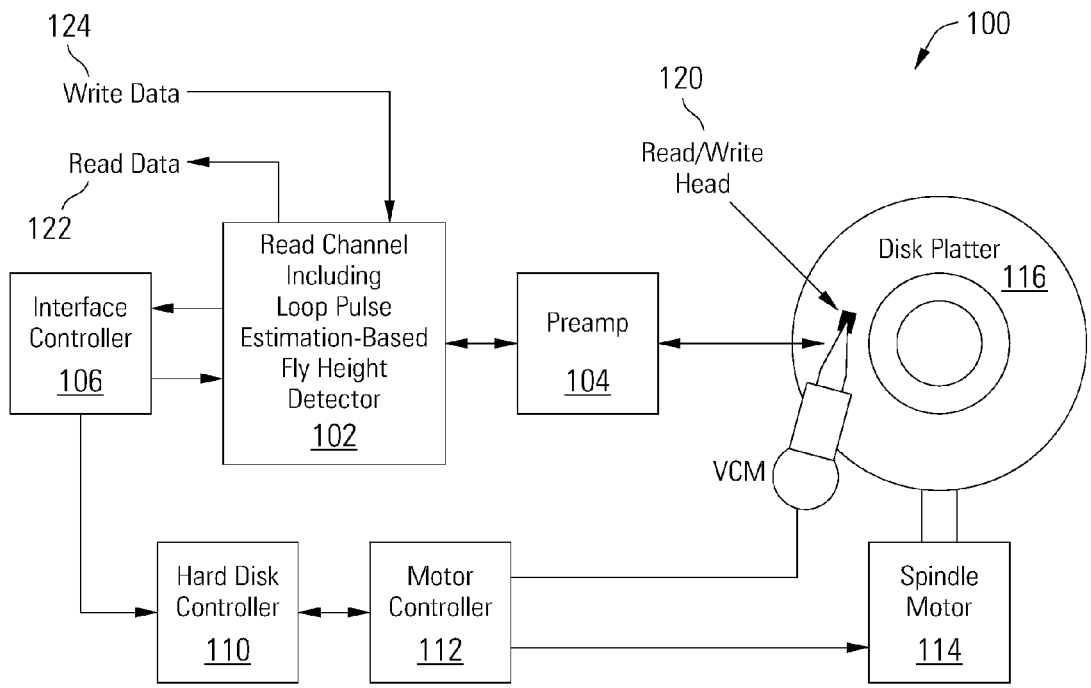
FIG. 1 depicts a block diagram of a storage system including a read channel circuit having a loop pulse estimation-based fly height detector in accordance with some embodiments of the present invention.

Turning to FIG. 1, a storage system 100 is disclosed which includes a read channel circuit 102 with a loop pulse estimation-based fly height detector in accordance with some embodiments of the present invention. Storage system 100 may be, for example, a hard disk drive. Storage system 100 also includes a preamplifier 104, an interface controller 106, a hard disk controller 110, a motor controller 112, a spindle motor 114, a disk platter 116, and a read/write head assembly 120. Interface controller 106 controls addressing and timing of data to/from disk platter 116. The data on disk platter 116 consists of groups of magnetic signals that may be detected by read/write head assembly 120 when the assembly is properly positioned over disk platter 116. In one embodiment, disk platter 116 includes magnetic signals recorded in accordance with either a longitudinal or a perpendicular recording scheme.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate (RPMs). Once read/write head assembly 120 is positioned adjacent the proper data track, magnetic signals representing data on disk platter 116 are sensed by read/write head assembly 120 as disk platter 116 is rotated by spindle motor 114. The sensed magnetic signals are provided as a continuous, minute analog signal representative of the magnetic data on disk platter 116. This minute analog signal is transferred from read/write head assembly 120 to read channel circuit 102 via preamplifier 104. Preamplifier 104 is operable to amplify the minute analog signals accessed from disk platter 116. In turn, read channel circuit 102 digitizes and decodes the received analog signal to recreate the information originally written to disk platter 116. This data is provided as read data 122 to a receiving circuit. A write operation is substantially the opposite of the preceding read operation with write data 124 being provided to read channel circuit 102. This data is then encoded and written to disk platter 116.

In addition to sensing data stored on disk platter 116, read/write head assembly 120 provides for detection of the fly height or separation between read/write head assembly 120 and disk platter 116 based on loop pulse estimation. In particular, in some embodiments, the PW50 or half-peak height of the normalized loop pulse estimation is calculated in read channel circuit 102, and the fly height is inferred based on the PW50 values. In some embodiments, the read/write head assembly 120 includes multiple read sensors as part of an array reader magnetic recording system or two dimensional magnetic recording system. In such embodiments, the fly height can be calculated based on data obtained from one or more of the multiple read sensors.

It should be noted that in some embodiments storage system 100 is integrated into a larger storage system such as, for example, a RAID (redundant array of inexpensive disks or redundant array of independent disks) based storage system. Such a RAID storage system increases stability and reliability through redundancy, combining multiple disks as a logical unit. Data can be spread across a number of disks included in the RAID storage system according to a variety of algorithms and accessed by an operating system as if it were a single disk. For example, data can be mirrored to multiple disks in the RAID storage system, or can be sliced and distributed across multiple disks in a number of techniques. If a small number of disks in the RAID storage system fail or become unavailable, error correction techniques can be used to recreate the missing data based on the remaining portions of the data from the other disks in the RAID storage system. The disks in the RAID storage system can be, but are not limited to, individual storage systems such storage system 100, and can be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that in some embodiments storage system 100 is modified to include solid state memory that is used to store data in addition to the storage offered by disk platter 116. This solid state memory may be used in parallel to disk platter 116 to provide additional storage. In such a case, the solid state memory receives and provides information directly to read channel circuit 102. Alternatively, the solid state memory may be used as a cache where it offers faster access time than that offered by disk platter 116. In such a case, the solid state memory may be disposed between interface controller 106 and read channel circuit 102 where it operates as a pass through to disk platter 116 when requested data is not available in the solid state memory or when the solid state memory does not have sufficient storage to hold a newly written data set. Based upon the disclosure provided herein, one of ordinary skill in the art will recognize a variety of storage systems including both disk platter 116 and a solid state memory.

Figure 2:
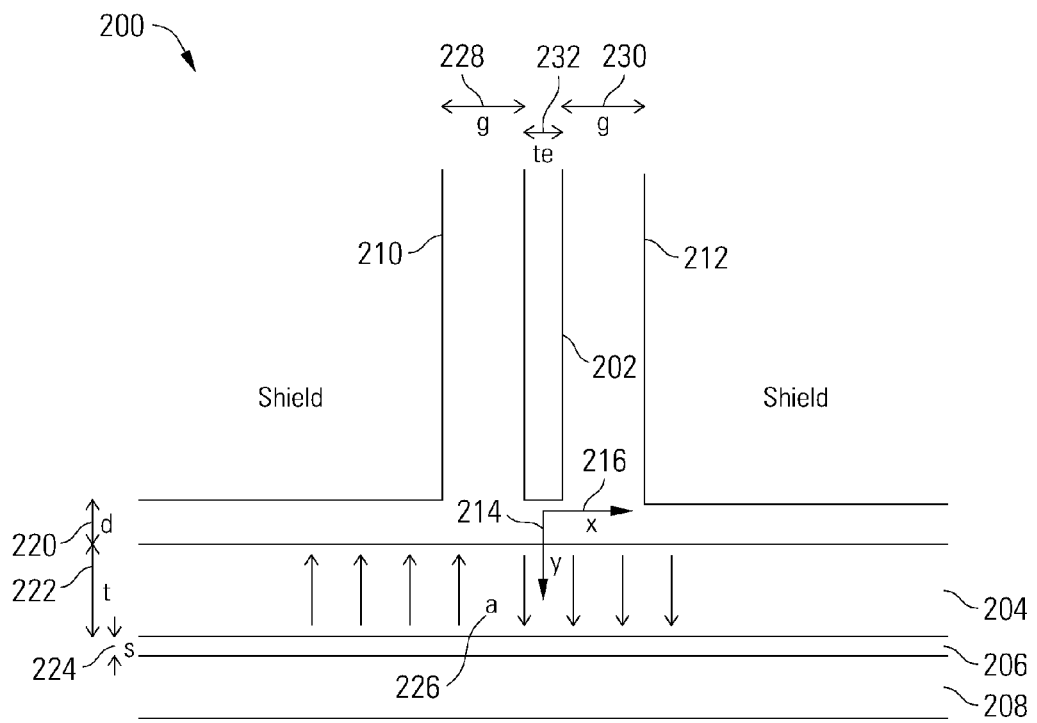
FIG. 2 graphically depicts an example read head disposed above the surface of a storage medium that may be used in relation to some embodiments of the present invention.

Turning to FIG. 2, a graphical depiction shows an example read head 202 or read sensor disposed above the surface of a magnetic storage medium 204 that may be used in relation to some embodiments of the present invention. A heater element (not shown) can be used to adjust the separation 220 between the read head 202 and the surface of the magnetic storage medium 204. By continuously monitoring the fly height of the read head 202 using a loop pulse estimation-based fly height detector, the signal power to the heater element can be controlled to adjust the separation 220, improving the signal to noise ratio of the readback signal from the read head 202 and thus improving data recovery performance from the read channel.

In some embodiments, the magnetic storage medium 204 comprises a hard disk platter having any suitable structure and magnetic properties to store and retrieve data using magnetic fields. For example, the magnetic storage medium 204 of thickness 222 may be formed on a growth layer 206 of thickness 224, which in turn is formed on a keeper layer 208. As the magnetic storage medium 204 is exposed to a magnetic field, the magnetic orientation of particles is altered based on the write data. A transition between two such magnetic orientations is illustrated in FIG. 2 by a series of upward-pointing arrows followed by a series of downward-pointing arrows in the magnetic storage medium 204.

The read head 202 comprises a magneto-resistive sensor, which is surrounded in some embodiments by magnetic shields 210, 212. As the read head 202 is passed over the magnetic storage medium 204, the read head 202 is subjected to varying magnetic fields based on the magnetic orientation of the particles in the magnetic storage medium 204. The varying magnetic fields cause the resistance of the magneto-resistive sensor to change, which causes an electrical current through the read head 202 to change accordingly. The analog signal or readback signal from the read head 202 is amplified, filtered, digitized and processed to detect the values of data bits and to perform error correction and other decoding to yield user data. The loop pulse estimate or channel impulse response of the read channel used to process the data is related to the separation 220 between the read head 202 and the magnetic storage medium 204 as the readback signal is obtained from the read head 202 and the corresponding data are processed.

A metric such as the PW50 distance for the loop pulse estimate is used to compute the fly height of the read head 202 over the magnetic storage medium 204, based on the relationship between the loop pulse estimate and the separation 220 between the read head 202 and the magnetic storage medium 204.

Turning to FIG. 3, a graph of the normalized channel impulse response 300 is shown, which in some instances can appear as a Gaussian pulse. The peak 302 of the normalized channel impulse response 300 is thus at magnitude 1. The PW50 308 is the distance between the two half-peak points 304, 306, or the points at which the magnitude of the normalized channel impulse response 300 is 0.5.

The PW50 value disclosed herein with reference to some embodiments of the invention is just one example of a metric for the loop pulse estimate that can be used in the fly height computation. Another metric that can be used in some embodiments is T50, the transition width of a written bit on a perpendicular magnetic recording medium, defining the signal range from 25% to 75% of peak value according to Equation 1:

$$T_{50} = \sqrt{d^2 + 2d(s+t) - s(2s+t) + \frac{g_{\text{eff}}^2}{4} + \frac{(g_{\text{eff}} + t_e)^2}{4} + \frac{\pi^4 a^2}{16}} \quad (\text{Eq 1})$$

where d is the fly height 220, s is the thickness 224 of the growth layer 206, t is the thickness 222 of the magnetic storage medium 204, g is the effective gap length 228, 230, $t_e$ is the thickness 232 of the read head 202 or read sensor, and a is the transition parameter 226. The loop pulse estimation-based fly height detector can use any suitable metric relating fly height to loop pulse estimation.

Turning to FIG. 4, a loop pulse estimation-based fly height detector 400 is depicted in accordance with some embodiments of the present invention. Digital samples 402 representing a readback signal from a magnetic storage medium are provided to a loop-pulse estimation circuit 404. The loop-pulse estimation circuit 404 which computes a loop pulse estimate 406 or impulse channel response. The loop-pulse estimation circuit 404 can compute the loop pulse estimate 406 in any suitable manner. In some embodiments, the loop-pulse estimation circuit 404 computes the loop pulse estimation 406 as a partial response target based on the digital samples 402 and on actual values of the digital samples 402, for example using detected values of the digital samples 402 generated by a Viterbi detector or maximum a posteriori detector. In some embodiments, the loop-pulse estimation circuit 404 applies a least mean squares algorithm to the digital samples 402 and the actual values of the digital samples 402 to yield the loop pulse estimate 406. If the digital samples 402 x[n] are represented as:

$$x[n] = \sum_k a[k]h[n-k] + w[n] \quad (\text{Eq 2})$$

where a[k] are the ideal values or non-return to zero (nrz) data corresponding to the digital samples 402, and are convolved with h[n−k], the channel impulse response or loop pulse estimate 406, contaminated by noise w[n]. In some embodiments, the loop-pulse estimation circuit 404 calculates the loop pulse estimate 406 ĥ[n] using a least mean square algorithm as follows:

$$\hat{h}[n] = \arg\min_{h[n]} \left\| x[n] - \sum_k \hat{a}[k]h[n-k] \right\| \quad (\text{Eq 3})$$

where ĥ[n] can have any desired number of output taps, such as, but not limited to, 10 taps. Based upon the disclosure provided herein, one of ordinary skill in the art will recognize a variety of loop pulse estimation circuits that may be used in relation to different embodiments of the present invention.

The loop pulse estimate 406 is provided to an accumulator 408, which accumulates the loop pulse estimate 406 ĥ[n] and averages the loop pulse estimate 406 ĥ[n] to reduce variation. The loop-pulse estimation circuit 404 can perform real time adaptation and can undergo slight variations. The accumulator 408 averages the resulting loop pulse estimate 406 to reduce such variations. The number of loop pulse estimate 406 values averaged can be set at any desired value to balance response time with sensitivity to variation, and in some embodiments is programmable. In some embodiments, the accumulator 408 is not enabled until the loop pulse estimate 406 converges, omitting the potentially inaccurate results at the start of the least mean square algorithm. The accumulator 408 can comprise any circuit suitable for averaging multiple input values. Based upon the disclosure provided herein, one of ordinary skill in the art will recognize a variety of accumulator circuits that may be used in relation to different embodiments of the present invention.

The averaged loop pulse estimate 410 from the accumulator 408 is provided to a fractional delay filterbank 412, which compensates for sampling mismatch. Turning to FIG. 7, a graph of normalized channel impulse response 700 illustrates discrete domain sampling points (e.g., 704, 706) in accordance with some embodiments of the present invention. Notably, the discrete domain sampling points (e.g., 704, 706) or real sampling points in the example of FIG. 7 do not correspond with the ideal sampling positions (e.g, 702), and do not include the peak of the normalized channel impulse response 700. The PW50 computed based on the real sampling points (e.g., 704, 706) will be slightly elevated over the true PW50, because peak normalization based on the non-ideal sampling points (e.g., 704, 706) will slightly scale the curve up. The 0.5 T (or any other) sampling offset thus causes maximal estimation uncertainty. The fractional delay filterbank 412 yields a number of outputs each with a different fractional delay. The fractional delay filterbank 412 can be any circuit suitable for providing multiple output versions of an input, each with a different fractional delay, such as, but not limited to, a series of delay filters with an output tied between each of the delay filters. Based upon the disclosure provided herein, one of ordinary skill in the art will recognize a variety of fractional delay circuits that may be used in relation to different embodiments of the present invention. In some embodiments, the fractional resolution is 0.1 T, with a series of nine fixed fractional delay filters included in the fractional delay filterbank 412. The output or delay value can be selected in any suitable manner, such as, but not limited to, selecting the output with the highest peak as the loop pulse estimate 414 with sampling correction.

The loop pulse estimate 414 with sampling correction is provided to a PW50 calculator 416, which computes the PW50 value 418 based on the loop pulse estimate 414 with sampling correction or, in some embodiments based on an averaged loop pulse estimate 410 or on a loop pulse estimate 406. The PW50 value 418 finds the peak of the loop pulse estimate or channel impulse response g[n], which can be averaged and/or have sampling correction applied to the taps in the channel impulse response g[n]. The channel response is normalized to the peak value, yielding normalized channel impulse response g̃[n]. The PW50 calculator 416 identifies indices $P_1$ and $P_2$ of taps in the normalized channel impulse response ĝ[n] such that g̃[$P_1$] and g̃[$P_2$] are closest to the half peak or 0.5 magnitude locations.

In some cases, even when sampling correction has been applied to the channel impulse response g[n] in the fractional delay filterbank 412, the loop pulse estimate 414 with sampling correction may not exactly align with the actual peak, because of the discrete granularity of the fractional delay applied by the fractional delay filterbank 412. In some embodiments, the PW50 calculator 416 also applies a linear interpolation algorithm to compute the locations $\beta_1$ and $\beta_2$ of the half-peak amplitudes as follows:

$$\beta_1 = \begin{cases} P_1 - 1 + \dfrac{0.5 - \tilde{g}[P_1 - 1]}{\tilde{g}[P_1] - \tilde{g}[P_1 - 1]} & \tilde{g}[P_1] > 0.5 \\ P_1 + \dfrac{0.5 - \tilde{g}[P_1]}{\tilde{g}[P_1 + 1] - \tilde{g}[P_1]} & \tilde{g}[P_1] < 0.5 \\ P_1 & \tilde{g}[P_1] = 0.5 \end{cases} \quad \text{(Eq 4)}$$

and $$\beta_2 = \begin{cases} P_2 + \dfrac{0.5 - \tilde{g}[P_2]}{\tilde{g}[P_2 + 1] - \tilde{g}[P_2]} & \tilde{g}[P_2] > 0.5 \\ P_2 - 1 + \dfrac{0.5 - \tilde{g}[P_2 - 1]}{\tilde{g}[P_2] - \tilde{g}[P_2 - 1]} & \tilde{g}[P_2] < 0.5 \\ P_2 & \tilde{g}[P_2] = 0.5 \end{cases} \quad \text{(Eq 5)}$$

The PW50 calculator 416 can include any suitable circuits for finding the peak of the input loop pulse estimate or channel impulse response, such as, but not limited to, a comparison circuit, and for normalizing the channel impulse response to the peak value, such as, but not limited to, a division circuit. The PW50 calculator 416 can include any suitable circuits for identifying the half-peak indices $P_1$ and $P_2$, and for interpolating to compute the locations $\beta_1$ and $\beta_2$ of the half-peak amplitudes, such as, but not limited to, comparators to identify half-peak indices and computation circuits to apply Equations 4 and 5. Based upon the disclosure provided herein, one of ordinary skill in the art will recognize a variety of PW50 calculation circuits that may be used in relation to different embodiments of the present invention.

The PW50 value 418 is provided to a fly height change calculator 420 which infers the fly height change based on the change in the PW50 value 418. The fly height change calculator 420 can be calibrated in a particular system for example by setting the fly height of the read sensor to known values, computing the loop pulse estimate 406 and the PW50 value 418 and observing the relationship between the PW50 value 418 and the fly height in the particular system. The fly height change calculator 420 can include any suitable circuit or device for identifying the fly height 422 based on the PW50 value 418, such as, but not limited to, a lookup table of fly height values or fly height value changes indexed by PW50 value 418 or change in PW50 value 418. The fly height change calculator 420 can be adapted to yield either absolute fly height values or relative fly height changes, in other words identifying changes in fly height based on changes in the PW50 value 418. Based upon the disclosure provided herein, one of ordinary skill in the art will recognize a variety of fly height change calculators that may be used in relation to different embodiments of the present invention.

The fly height 422 is provided to a fly height controller 424, which generates a control signal 426 that adjusts the fly height of the read/write head assembly. In some embodiments, the fly height controller 424 generates a regulated current to a heater on the read/write head assembly. Changes made to the current cause the heater to heat or cool, which causes the read/write head assembly to become nearer or farther from the storage medium.

Some or all elements of the loop pulse estimation-based fly height detector 400 can be implemented in an integrated circuit, such as, but not limited to, including the loop-pulse estimation circuit 404, accumulator 408, fractional delay filterbank 412 and PW50 calculator 416 in an integrated circuit, such as a read channel integrated circuit.

Figure 5:
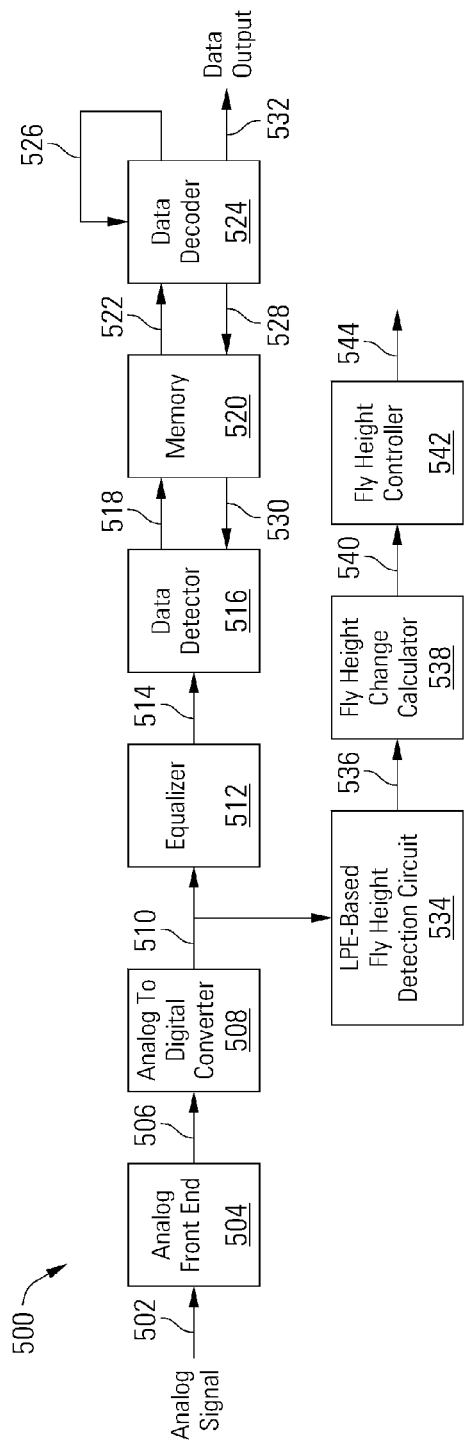
FIG. 5 depicts a block diagram of a data processing system including a loop pulse estimation-based fly height detector in accordance with some embodiments of the present invention.

Turning to FIG. 5, a data processing system 500 including a loop pulse estimation-based fly height detector 534 is depicted in accordance with some embodiments of the present invention. Data processing circuit 500 includes an analog front end circuit 504 that receives an analog signal 502. Analog front end circuit 504 processes analog signal 502 and provides a processed analog signal 506 to an analog to digital converter circuit 508. Analog front end circuit 504 may include, but is not limited to, an analog filter and an amplifier circuit as are known in the art. Based upon the disclosure provided herein, one of ordinary skill in the art will recognize a variety of circuitry that may be included as part of analog front end circuit 504. In some cases, analog input signal 502 is derived from a read/write head assembly that is disposed in relation to a storage medium. Based upon the disclosure provided herein, one of ordinary skill in the art will recognize a variety of source from which analog signal 502 may be derived.

Analog to digital converter circuit 508 converts processed analog signal 506 into a corresponding series of digital samples 510. Analog to digital converter circuit 508 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention.

Digital samples 510 are provided to an equalizer circuit 512 which applies an equalization algorithm to digital samples 510 to yield an equalized output 514. In some embodiments of the present invention, equalizer circuit 512 is a digital finite impulse response filter circuit as are known in the art.

The equalized output 514 is processed in a data detector circuit 516 to yield detected output 518. Data detector circuit 516 is a data detector circuit capable of producing detected output 518 by applying a data detection algorithm to a data input. In some embodiments, the data detection algorithm can be, but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention.

Detected output 518 is provided to a central queue memory circuit 520 that operates to buffer data passed between data detector circuit 516 and data decoder circuit 524. When data decoder circuit 524 is available, data decoder circuit 524 receives detected output 518 from the central queue memory 520 as a decoder input 522. Data decoder circuit 524 applies a data decoding algorithm to decoder input 522 in an attempt to recover originally written data. The result of the data decoding algorithm is provided as a decoded output 528. Data decoder circuit 524 may be any data decoder circuit known in the art that is capable of applying a decoding algorithm to a received input such as, but not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 524 provides the result of the data decoding algorithm as a hard decision data output 532.

One or more iterations through the combination of data detector circuit 524 and data decoder circuit 516 may be made in an effort to converge on the originally written data set. As mentioned above, processing through both the data detector circuit and the data decoder circuit is referred to as a "global iteration". For the first global iteration, data detector circuit 524 applies the data detection algorithm without guidance from a decoded output. For subsequent global iterations, data detector circuit 524 applies the data detection algorithm to equalized output 514 as guided by decoded output 528. Decoded output 528 is received from central queue memory 520 as a detector input 530.

During each global iteration it is possible for data decoder circuit 516 to make one or more local iterations including application of the data decoding algorithm to decoder input 522. For the first local iteration, data decoder circuit 516 applies the data decoder algorithm without guidance from a decoded output 526. For subsequent local iterations, data decoder circuit 516 applies the data decoding algorithm to decoder input 522 as guided by a previous decoded output 526. Again, the loop pulse estimation used to calculate fly height can be performed based on digital samples 510 and on actual values of the digital samples 510. In some embodiments, the detected output 518 or decoded output 532 is used as the actual values of the digital samples 510.

The digital samples 510 and, in some cases, detected output 518, are provided to a loop pulse estimation-based fly height detection circuit 534. The loop pulse estimation-based fly height detection circuit 534 performs the functions of loop-pulse estimation circuit 404 and PW50 calculator 416, and in some cases, accumulator 408 and fractional delay filterbank 412 where averaging and sampling correction is desired, yielding PW50 value 536. A fly height change calculator 538 infers the fly height change 540 based on the change in the PW50 value 536. A fly height controller 542 adjusts a control signal 544 used to control the fly height, for example driving a heater on the read/write head assembly.

Figure 6:
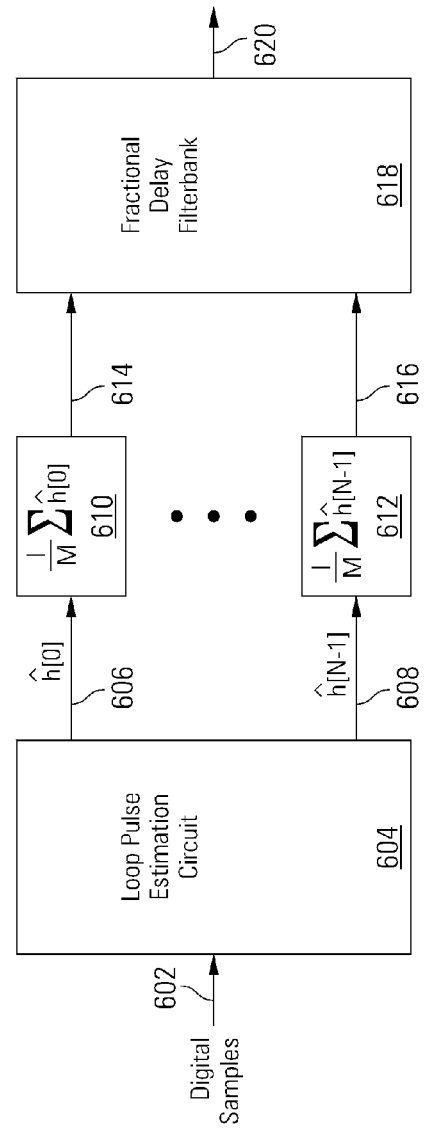
FIG. 6 depicts a block diagram of a portion of a loop pulse estimation-based fly height detector including per-tap accumulation in accordance with some embodiments of the present invention.

Turning to FIG. 6, a portion of a loop pulse estimation-based fly height detector 600 is depicted including per-tap accumulation in accordance with some embodiments of the present invention. Where averaging is applied to the loop pulse estimation to reduce variation in the loop pulse estimation, the accumulation and averaging can be performed on a per-tap basis as shown in FIG. 6. A loop pulse estimation circuit 604 receives digital samples 602 and computes N taps $\hat{h}[0]$ 606 through $\hat{h}[N-1]$ 608 of the channel impulse response. An accumulator 610, 612 is provided for each of the N taps $\hat{h}[0]$ 606 through $\hat{h}[N-1]$ 608, averaging them to yield averaged output taps 614, 616 of the channel impulse response. A fractional delay filterbank 618 filters the taps of the channel impulse response, yielding a sampling corrected channel impulse response 620 which can also include multiple taps.

Figure 8:
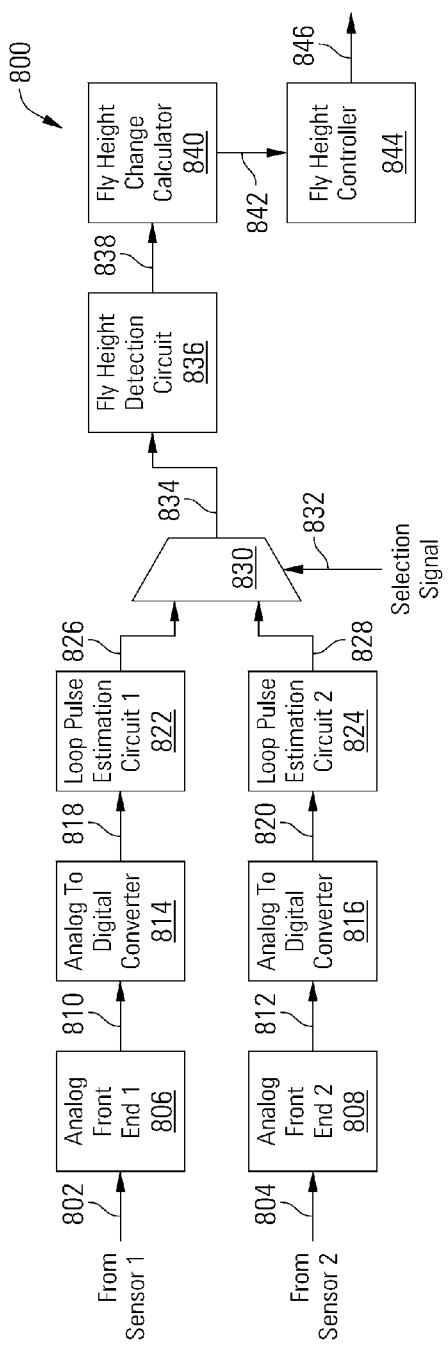
FIG. 8 depicts a block diagram of an array-reader magnetic recording data processing system including loop pulse estimation-based fly height detection in accordance with some embodiments of the present invention.

Turning to FIG. 8, the loop pulse estimation-based fly height detection can also be performed in an array-reader magnetic recording system, in which multiple read sensors are included in the read/write head to read a single data track simultaneously. The array-reader magnetic recording data processing system 800 including loop pulse estimation-based fly height detection includes a processing path for each readback signal. A first analog signal 802, derived from a first read sensor, is provided to a first analog front end circuit 806, and a second analog signal 804, derived from a second read sensor, is provided to a second analog front end circuit 808. Analog front end circuits 806, 808 process analog signals 802, 804 and provide processed analog signals 810, 812 to analog to digital converter circuits 814, 816.

Analog to digital converter circuits 814, 816 convert processed analog signals 802, 804 into corresponding series of digital samples 818, 820. Loop pulse estimation circuits 822, 824 compute channel impulse responses 826, 828 based on the series of digital samples 818, 820, respectively, and on ideal values of the series of digital samples 818, 820. The channel impulse responses 826, 828 can be selected in multiplexer 830 based on a selection signal.

A fly height detection circuit 836 calculates a PW50 value 838 based on the selected channel impulse response 834. A fly height change calculator 840 infers the change in the fly height 842 based on the change in the PW50 value 838, and a fly height controller 844 adjusts the control signal 846 based on the change in the fly height 842. Circuitry can be shared in a variety of manners, for example sharing a single fly height detection circuit 836 for multiple read sensors, sharing loop pulse estimation circuits, etc. The resulting PW50 values for the multiple read sensors can be used separately, or can be combined in any desired manner to yield a fly height for the read/write head assembly including the multiple read sensors.

Figure 9:
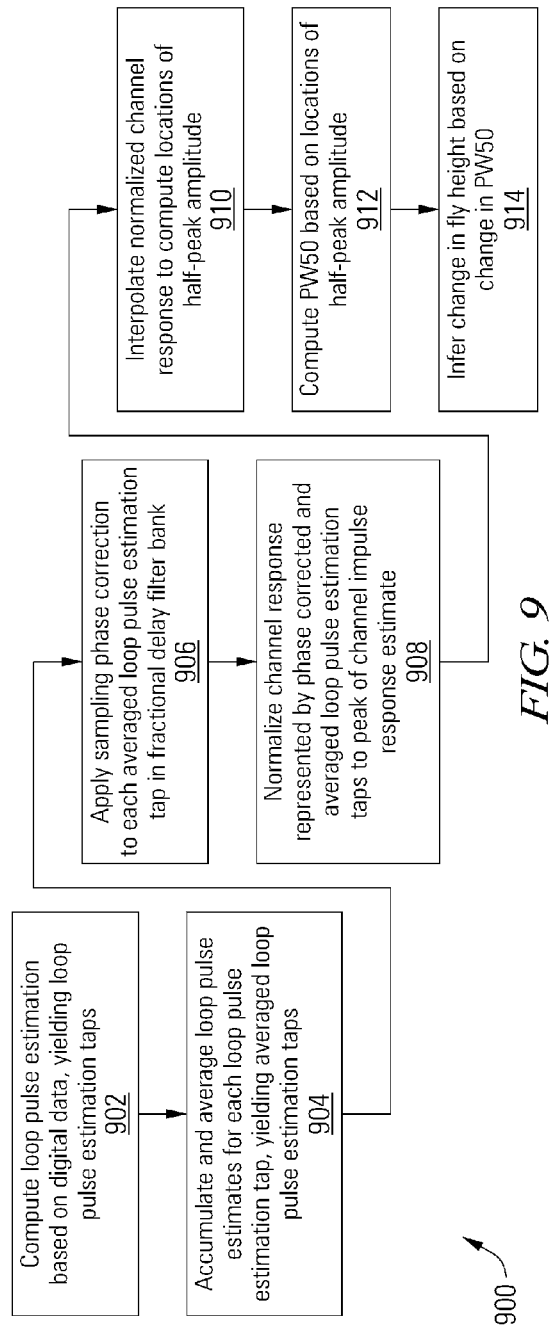
FIG. 9 is a flow diagram showing a method for computing fly height based on loop pulse estimation in accordance with some embodiments of the present invention.

Turning now to FIG. 9, a flow diagram 900 shows a method for computing fly height based on loop pulse estimation in accordance with some embodiments of the present invention. Following flow diagram 900, the loop pulse estimate is computed based at least in part on digital data, yielding loop pulse estimation taps. (Block 902) The loop pulse estimates are accumulated and averaged for each loop pulse estimation tap, yielding averaged loop pulse estimation taps. (Block 904) Sampling phase correction is applied to each averaged loop pulse estimation tap in a fractional delay filter bank (Block 906) The channel impulse response represented by phase corrected and averaged loop pulse estimation taps is normalized to the peak of the channel impulse response estimate. (Block 908) The normalized channel response is interpolated to compute locations of half-peak amplitude. (Block 910) The PW50 value is computed based on locations of half-peak amplitude. (Block 912) The change in the fly height is inferred based on the change in the PW50 value. (Block 914)

The fly height detection based on loop pulse estimate provides real time fly height estimation, and can be applied to array reader magnetic recording systems. When applied to array reader magnetic recording systems, fly height detection circuitry can be shared across readback paths from the array of read sensors, saving both circuit area and power.

It should be noted that the various blocks shown in the drawings and discussed herein can be implemented in integrated circuits along with other functionality. Such integrated circuits can include all of the functions of a given block, system or circuit, or a subset of the block, system or circuit. Further, elements of the blocks, systems or circuits can be implemented across multiple integrated circuits. Such integrated circuits can be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein can be implemented in either software or firmware. In some such cases, the entire system, block or circuit can be implemented using its software or firmware equivalent. In other cases, the one part of a given system, block or circuit can be implemented in software or firmware, while other parts are implemented in hardware.

In conclusion, the present invention provides novel loop pulse estimation-based fly height detection and detectors. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. An apparatus for storing data, comprising:
   a storage medium;
   a head assembly disposed in relation to the storage medium and operable to read and write data on the storage medium;
   a loop pulse estimation circuit operable to estimate a channel impulse response based on the data read by the head assembly; and
   a fly height detection circuit operable to detect a spacing between the head assembly and the storage medium based at least in part on the channel impulse response, wherein the fly height detection circuit comprises a PW50 calculation circuit operable to calculate a distance between half-peak locations on a normalized channel impulse response curve.

2. The apparatus of claim 1, further comprising a heating element connected to the head assembly, wherein the spacing is controlled by the heating element based on an output of the fly height detection circuit.

3. The apparatus of claim 1, wherein the loop pulse estimation circuit comprises a plurality of tap coefficient outputs.

4. The apparatus of claim 3, wherein the fly height detection circuit is operable to detect the spacing based at least in part on a difference between a pair of tap coefficients closest to half peak channel response values.

5. The apparatus of claim 3, further comprising an accumulator for each of the plurality of tap coefficient outputs operable to accumulate tap coefficients on the plurality of tap coefficient outputs, wherein the fly height detection circuit is operable to detect the spacing based at least in part on averaged tap coefficients from the accumulators.

6. The apparatus of claim 3, further comprising a plurality of fractional delay filters operable to interpolate between values for tap coefficients on the plurality of tap coefficient outputs to move a pair of the tap coefficients closer to half peak channel response values.

7. The apparatus of claim 1, wherein the loop pulse estimation circuit is operable to estimate the impulse channel response based at least in part on digital samples of the data, on ideal values of the digital samples, and on past values of the impulse channel response.

8. The apparatus of claim 1, wherein the head assembly comprises an array reader, and wherein the loop pulse estimation circuit comprises an array of estimation circuits each operable to estimate the impulse channel response based on the data read by a different element of the array reader.

9. The apparatus of claim 8, further comprising a selection circuit operable to select between outputs of each of the array of estimation circuits, wherein the fly height detection circuit is operable to detect the spacing between the head assembly and the storage medium based at least in part on the impulse channel response from a member of the array of estimation circuits selected by the selection circuit.

10. A method for computing fly height in a storage device, comprising:
    computing a loop pulse estimate based at least in part on digital data read from the storage device by a read sensor;
    normalizing the loop pulse estimate to a peak value of the loop pulse estimate to yield a normalized loop pulse estimate;
    computing a distance between half-peak points in the normalized loop pulse estimate; and
    calculating a change in fly height between the read sensor and a storage medium in the storage device based at least in part on a change in the distance between the half-peak points.

11. The method of claim 10, wherein the distance between the half-peak points comprises a PW50 value.

12. The method of claim 10, wherein computing the loop pulse estimate comprises applying a least mean square algorithm to the digital data and to ideal values of the digital data.

13. The method of claim 10, further comprising accumulating and averaging the loop pulse estimate.

14. The method of claim 13, wherein the accumulating and averaging is performed for each of a plurality of taps in the loop pulse estimate.

15. The method of claim 10, further comprising applying sampling correction to the loop pulse estimate in a fractional delay filter.

16. The method of claim 10, further comprising interpolating to compute locations of the half-peak points.

17. The method of claim 10, wherein the storage device comprises an array reader magnetic recording system, further comprising selecting digital data from one of a plurality of read sensors in the storage device and computing the loop pulse estimate from the selected digital data.

18. A storage device comprising:
    a storage medium;
    a read/write head assembly disposed in relation to the storage medium, wherein the read/write head assembly comprises an array of read sensors; and
    a fly height detector comprising:
    a plurality of loop pulse estimation circuits, one for each read sensor in the array of read sensors, connected to signals derived from the array of read sensors;
    a selection circuit connected to the plurality of loop pulse estimation circuits; and
    a fly height detection circuit connected to an output of the selection circuit.

19. The storage device of claim 18, wherein the loop pulse estimation circuits each comprise a plurality of tap coefficient outputs, wherein the fly height detection circuit is operable to detect a fly height based at least in part on a difference between a pair of tap coefficients closest to half peak channel response values.

20. The storage device of claim 19, wherein the fly height detector further comprises an accumulator for each of the plurality of tap coefficient outputs operable to accumulate tap coefficients on the plurality of tap coefficient outputs, wherein the fly height detector is operable to detect fly height based at least in part on averaged tap coefficients from the accumulators.

* * * * *